United States Patent [19]

Scatizzi

[11] Patent Number: 5,360,141
[45] Date of Patent: Nov. 1, 1994

[54] DEVICE FOR METERING POWDER, GRAINED OR MICROPEARL DYEING MATERIALS

[75] Inventor: Mario Scatizzi, Pistoia, Italy

[73] Assignee: Tecnorama S.R.L., Florence, Italy

[21] Appl. No.: 110,403

[22] Filed: Aug. 23, 1993

Related U.S. Application Data

[63] Continuation-in-part of Ser. No. 865,081, Apr. 8, 1992, abandoned.

[30] Foreign Application Priority Data

Apr. 8, 1991 [IT] Italy ................... PT 91A006

[51] Int. Cl.5 .................. B07B 9/00; B65B 1/34; G01G 13/00
[52] U.S. Cl. .................. 222/55; 177/116; 177/120; 209/21; 209/358; 222/77; 222/189; 222/233; 222/410
[58] Field of Search .............. 222/53, 55, 58, 77, 222/152, 189, 233–239, 410, 630; 141/83; 209/21, 358, 379, 385; 177/116, 119–122

[56] References Cited

U.S. PATENT DOCUMENTS

| | | | |
|---|---|---|---|
| 2,984,387 | 5/1961 | White | 222/58 |
| 3,099,368 | 7/1963 | Turner et al. | 222/58 |
| 3,319,828 | 5/1967 | Maxwell | 222/58 X |
| 3,797,890 | 3/1974 | Walters | 141/83 X |
| 3,841,530 | 10/1974 | Jannick | 222/189 |
| 4,083,462 | 4/1978 | Teske et al. | 222/239 X |
| 4,182,383 | 1/1980 | Adomitis et al. | 141/83 X |
| 4,320,855 | 3/1982 | Ricciardi et al. | 222/58 X |
| 4,481,985 | 11/1984 | Bruder et al. | 141/83 X |
| 4,688,610 | 8/1987 | Campbell | 141/128 X |
| 4,756,348 | 7/1988 | Moller | 141/83 |
| 4,944,428 | 7/1990 | Gmür et al. | 222/55 |
| 5,006,995 | 4/1991 | Toschi et al. | 222/55 X |
| 5,024,352 | 6/1991 | Gmür et al. | 222/77 X |
| 5,110,521 | 5/1992 | Moller | 222/55 X |

FOREIGN PATENT DOCUMENTS

| | | | |
|---|---|---|---|
| 552258 | 11/1956 | Belgium | 209/358 |
| 552259 | 11/1956 | Belgium | 209/358 |
| 90142705 | 2/1991 | Germany . | |
| 0148916 | 6/1989 | Japan | 222/77 |
| 0062325 | 3/1990 | Japan | 222/77 |
| 91004933 | 4/1991 | WIPO | 222/77 |

*Primary Examiner*—Kevin P. Shaver
*Attorney, Agent, or Firm*—McGlew & Tuttle

[57] ABSTRACT

Device for quickly variable and high precision metering of powder, granulated or micropearl dyeing material including a container 1 for the dyeing material that is put under vacuum by means of a suction tube 7 from the outside, and a mesh-sieve 5 fixed on the base of tile container 1. A scraper 2 rotates on the sieve 5 with a changeable speed. A scraper 2 rotates on the sieve 5 with a changeable speed. A compass-type shutter, with a changeable port, is mounted under the sieve 5, and a precision balance 20 is mounted below the shutter 6. An electronic computer 30 is programmed for checking and con trolling the rotation speed of the scraper 2, the opening/closing of the shutter 6 and the weight value of the balance 20.

7 Claims, 3 Drawing Sheets

DEVICE FOR METERING POWDER, GRAINED OR MICROPEARL DYEING MATERIALS

This is a continuation-in-part application of application Ser. No. 07/865,081 filed Apr. 8, 1992, now abandoned.

FIELD OF THE INVENTION

This invention relates to a device for metering powder, and granulated or micropearl dyeing materials, especially for the textile, tanning and paper industry.

BACKGROUND OF THE INVENTION

A device to collect and distribute powder material is known from the document DE-U-9 014 270. In the version illustrated in FIGS. 1-3 of this document, there includes a plate with several holes through which the material passes by means of a collecting device with a pallet rotating round a vertical shaft, which is moved by means of a relative driving element. A plate beneath the above mentioned perforated plate allows the material sifted in this way to be collected, and a scythe-shaped blade, which is operated by means of the vertical shaft, conveys the collected material into a central outgoing duct.

But this device does not provide for the control of the size of the grains of the sifted material and, furthermore, it does not allow the quick adjustment of the flow rate of the treated material. This highly reduces the device's elasticity degree and limits its employment to the applications for which it is not necessary to quickly change the quantity of the worked material, for example the transfer of material from a silo to another or to its package.

From the same document, a device to collect the granulated material is also known, which, in the version illustrated in FIGS. 4-6, is provided with several plane elements, which are moved horizontally and alternately in the two directions, and which convey the material to be treated into relative diagonal slits or into relative holes on a plate. For the control of the size of the grains of the worked material, a second perforated plate is positioned below the first one in such a way that the holes or the slits of the two plates correspond either exactly or only partially.

But this device also can not guarantee the necessary degree of elasticity for those applications which continuously require quick changes of the flow rate of the material outgoing from the device.

SUMMARY AND OBJECTS OF THE INVENTION

The main aim of this invention is to eliminate the above mentioned disadvantages.

This result has been reached, according to the invention, by designing a device for metering powder, granulated or micropearl material, especially dyeing material, and having this device include means for collecting the dyeing material; means for the compaction and the ejection of the dyeing material from the collecting means; means for the separation of the particles of the dyeing material outgoing from the collecting means; means for metering the treated dyeing material; in which the means for collecting the dyeing material consist of a cylindrical vertical container with a lateral port for the input of the dyeing material, with an upper chamber connected to it by means of a hopper and with devices for the suction from this upper chamber; and this device is provided with means for weighing the outgoing dyeing material and with an electronic computer for checking and controlling the functions carried out by all the above mentioned devices.

The advantages which result from the invention essentially consist in the fact that is possible to adjust the quantity of the worked dyeing material continuously, quickly and with high precision, even if in very fine powder form and with weight variation from a thousandth to a hundredth of a gram; and that it is possible to assure a high degree of reliability even after a long working period.

These and other advantages and characteristics of the invention will be better understood by any skilled person in this field thanks to the following description and the accompanying drawing, given as a practical example of the invention, but not to be considered in a restrictive sense, in which the only figure is the longitudinal section view of a device according to the invention.

DETAILED DESCRIPTION OF THE PREFERRED EMBODIMENT

Figure 1:
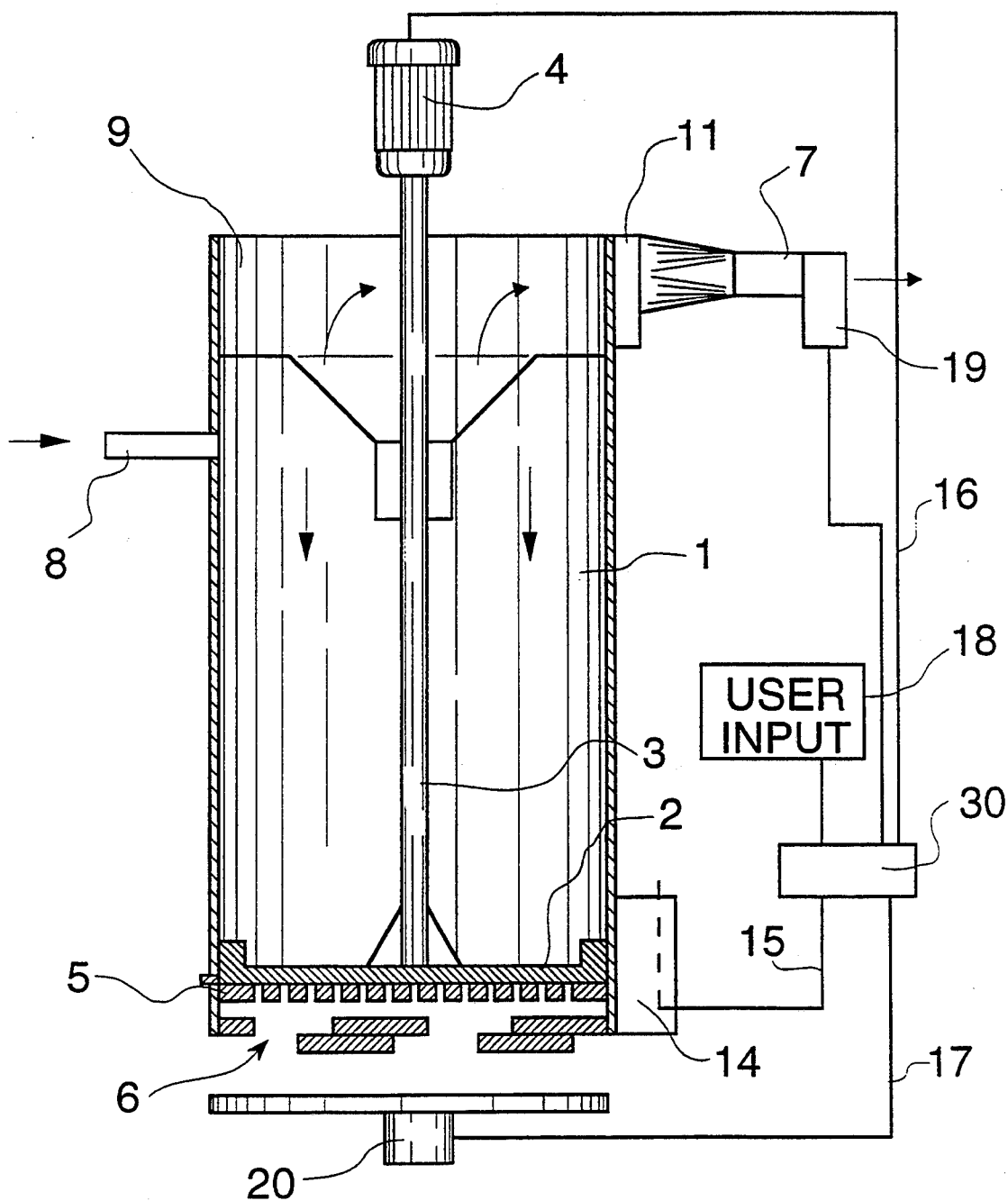
FIG. 1 is a side view of the invention.
Figure 3:
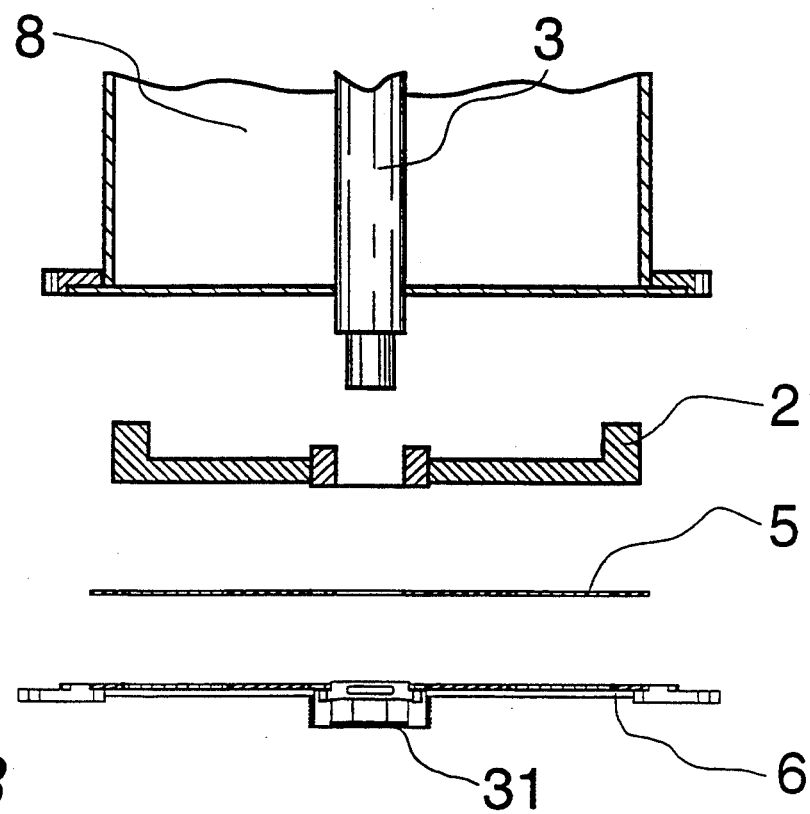
FIG. 3 is an exploded view of the lower end of FIG. 1.
Figure 2:
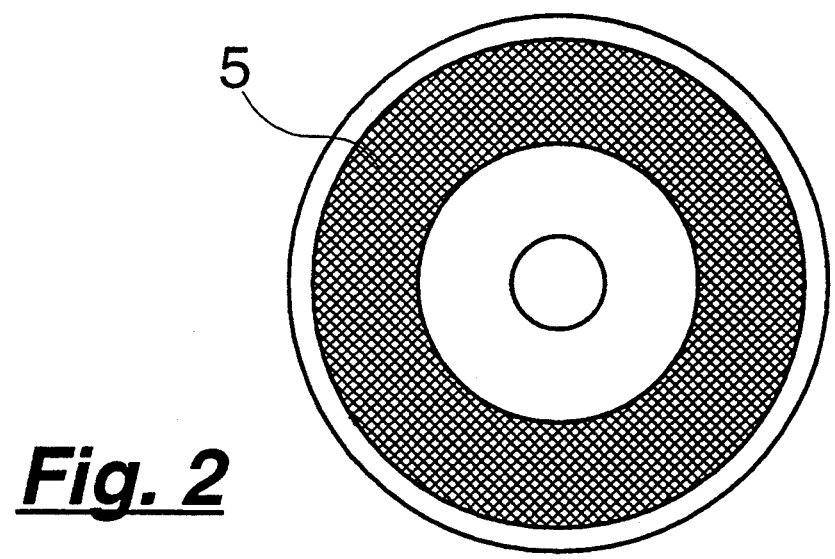
FIG. 2 is a plan view of a mesh-sieve.

Reduced to its essential structure and referring in particular to FIG. 1 of the accompanying drawing, a device for metering the powder, granulated or micropearl dyeing material includes:

a container 1 for collecting the dyeing material to be treated, and which is supplied from a store through an input tube 8;

a mesh-sieve 5 mounted fixed at the base of the container 1 with an upper scraper 2 rotating by means of a variable speed electric scraper motor 4 with shaft 3 for the compaction and the ejection of the dyeing material;

a shutter means 6, preferably a compass or rotary-type mounted below the sieve 5 for metering the outgoing dyeing material from the container 1, the shutter means 6 being opened and closed by a shutter motor 14 mounted on the side of the container 1 or a shutter motor 31 mounted below the shutter means 6;

a precision balance or scale 20 for weighing the dyeing material going through the port of the shutter 6;

an electronic computer 30 for checking and controlling the rotation speed of the scraper 2, the opening of the shutter 6 and the weight value of the balance 20.

More particularly, the collecting device is provided with an input means comprising a upper chamber 9 connected to the container 1 by means of a central hopper 10 with a vertical axis. The upper chamber 9 is further connected to an external aspirator 19 by means of a tube 7 provided with a filter 11, in such a way to draw air out of the container 1 and cause a decompression in the container 1. This decompression in the container 1 causing powder to flow into the container 1 from the input tube 8 and favor the separation and the fall of the particles which constitute the dyeing material.

Figure 4:
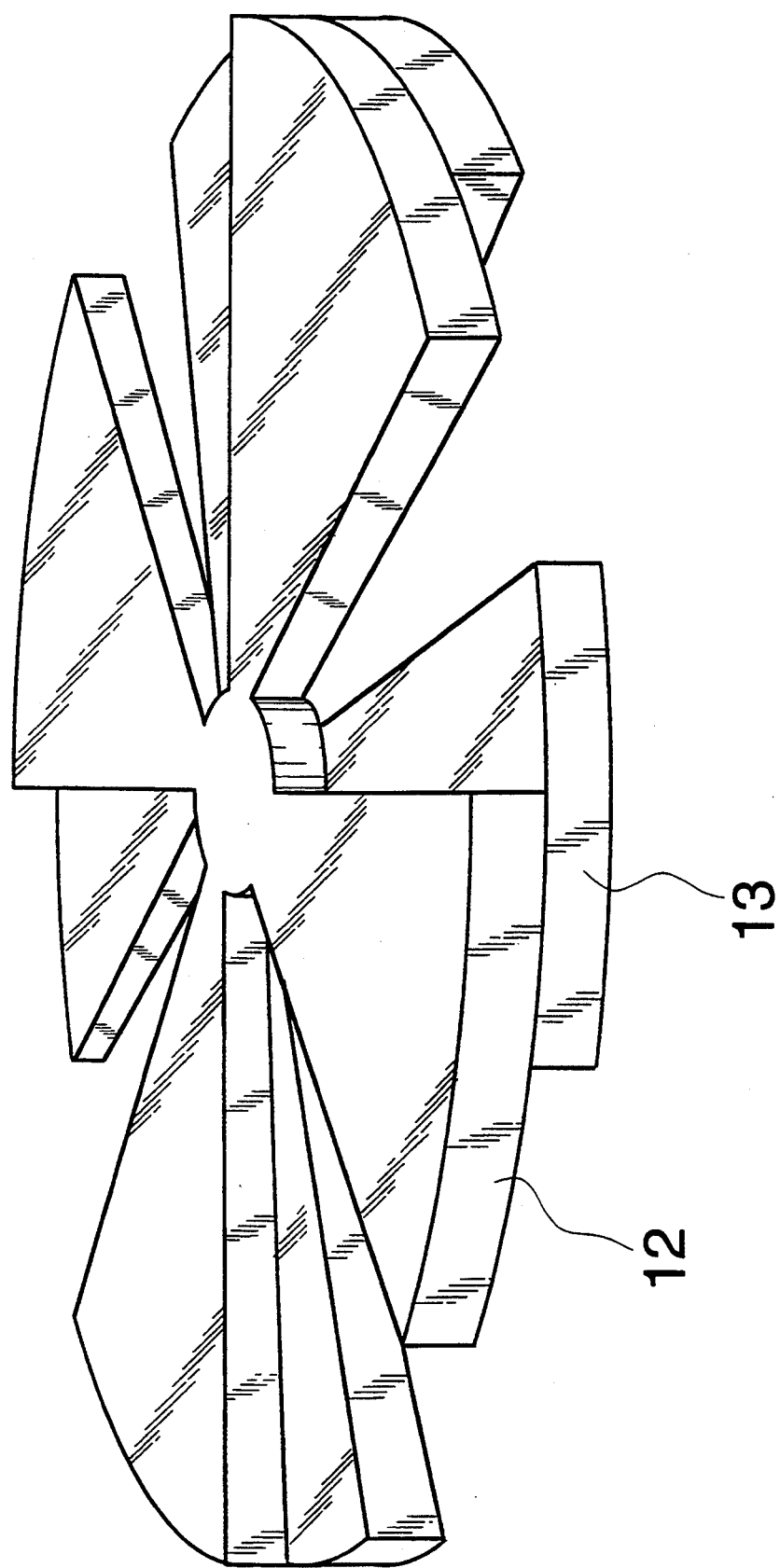
FIG. 4 is a perspective view of the shutter 6.

The shutter means 6, as shown in FIG. 4, is a rotary or compass type, however lateral or spiral shutters, as commonly used, in cameras are possible. The shutter means in FIG. 4 contains a first plate 12 and a second plate 13. Both first and second plates have at least one opening and the plates are rotatable with respect to each other to align the openings and pass the powder. The plates can also align to close the opening and block passage of the powder.

The shutter motor 14 or 31 is controlled by the computer 30 over a shutter interface 15. The scraper motor 4 is also controlled by the computer 30 over a scraper interface 16. The computer 30 can read the weight of the powder past through the shutter means 6 by reading the scale 20 over a scale interface 17. Any of the many known interface protocols can be used between the scale 20, the shutter motor 14,31, the scraper motor 4 and the computer 30. An operator enters a desired weight of powder into the computer 30 via a user input 18. The computer 30 signals the scraper motor 4 to start turning which turns the scraper and forces the powder through the mesh 5. The computer 30 also activates the shutter motor 14, 31 to open the shutter means and allow powder to exit the container 1. The balance 20 measures the weight of the powder exiting the shutter means 6. The computer 30 reads the weight from the scale 20 and slows down the scraper motor 4 and activates the shutter motor 14, 31 to slowly close the shutter as the weight read from the scale 20 approaches the desired weight entered by the operator. When the weight read from the scale 20 equals the desired weight, the computer 30 stops the scraper motor 4 and activates the shutter motor to close the shutter means 6. The shutter means 6 can also include position means indicating over shutter interface 15 to the computer 30 the present position of the shutter means 6. The aspirator 19 can also be connected to the computer 30 and activated when more powder is desired.

Another advantage, according to the invention, is that the computer 30 can be programmed in order to allow the most wide variation of the quantity and/or of the dimensions, that is the metering, of the particles of dyeing material treated by the device, according to the contingent needs of the working sections which use the dyeing material.

The operation of the device is the following.

The dyeing material is put into the container 1 through the input tube 8. The dyeing material is accurately subdivided into its particles by the air stream created by the aspirator. The particles then fall to the bottom, where the scraper 2 compresses them and conveys them through the meshes of the sieve 5. The adjustment of the quantity of dyeing material outgoing from the container 1 is carried out either by means of the shutter 6, the more or less opening of which is controlled by the balance 20 through the computer 30, according to the weight that it carries out at any one time, and/or by adjusting the rotation speed of the scraper 2 in order to compress a bigger or smaller quantity of dyeing material through the holes of the sieve 5. The adjustment is controlled by the computer 30 which in turn is informed by a suitable control program.

The air stream divides or breaks up the dye material or powder into its individual particles, and the individual particles of the powder then falls to the bottom of the container 1. The powder is thereby then known as being loose.

The computer 30 reads weight values from the balance 20 which weighs the powder going through the shutter 6. The communication between the balance 20 and the computer 30 can be done by any known computer communication protocol. The computer 30 also controls the rotation of the scraper 2 and the opening/closing of the shutter 6. Varying the rotational speed of the scraper changes the amount of powder passed through the mesh-sieve 5. The computer 30 measures the amount of powder through the balance 20, and controls the amount of powder passed by controlling the opening and closing of the shutter 6 and the rotational speed of the scraper 2. The computer then varies the passage of the powder by varying the shutter 6 and the scraper 2 in order to cause the balance 20 to indicate that the proper amount of powder has been passed. In this way the present invention is able to meter and dispense a very accurate amount of powder, especially since the passage of the powder is controlled in on different ways.

The controlling of the scraper 2 can be done by controlling the speed of the electric motor 4 in any known manner depending on the type of electric motor and the computer communication protocol desired. Likewise the opening and closing of the shutter 6 can be performed in any known manner depending on the type of shutter means 6, the type of shutter motor 14, 31, and the computer communication protocol.

While a specific embodiment of the invention has been shown and described in detail to illustrate the application of the principles of the invention, it will be understood that the invention may be embodied otherwise without departing from such principles.

What is claimed is:

1. A device for metering powder, the device comprising:

a container;

input means connected to said container and for supplying the powder to said container;

a sieve extending across one end of said container;

scraper means positioned inside said container and positioned against said sieve, said scraper means being for compaction and ejection of the powder;

shutter means positioned on a side of said sieve opposite to said scraper means, and for opening and closing to pass and block the powder exiting said container;

a shutter motor for activating said shutter means between said opening and closing;

balance means for weighing the powder passing through said shutter means;

computer means for reading a weight of the powder from said balance means and for controlling a rotational speed of said scraper means and for controlling said opening and closing of said shutter means through said shutter motor, said computer means varying said rotational speed of said scraper and said opening and closing of said shutter means to cause a predetermined weight of powder to pass through said shutter means as indicated by said balance means.

2. A device in accordance with claim 1, wherein:

said input means includes an input tube from a store, an upper chamber connected to another end of said container by a central hopper, and an output tube leading from the container to an aspirator means for drawing air out of said container to cause powder to flow into said container from said input tube;

said sieve is fixedly mounted on a base of said container and is of a mesh type;

said scraper means includes a scraper blade connected to a shaft and an adjustable speed electric motor connected to said shaft.

3. A device in accordance with claim 1, wherein:
said computer means is programmable for a wide variation of one of quantity, dimension, and both quantity and dimension of the powder.

4. A device in accordance with claim 1, wherein:
said scraper means includes a variable speed motor means for rotating a scraper blade at varying rotational speeds in response to commands from said computer means.

5. A device in accordance with claim 1, wherein:
said scraper means ejects the powder through the sieve.

6. A device in accordance with claim 1, wherein:
said input means separates the powder into separate individual particles that fall loose onto said sieve.

7. A device in accordance with claim 2, wherein:
said computer means controls said aspirator and cause said aspirator to draw air from said container when powder is desired.

* * * * *